(12) United States Patent
Ward et al.

(10) Patent No.: US 8,567,015 B2
(45) Date of Patent: Oct. 29, 2013

(54) CABLE TERMINATION SYSTEM

(75) Inventors: Phillip Allan Ward, Littleport (GB); James Robert Young, Littleport (GB)

(73) Assignee: JDR Cable Systems, Ltd., Hartle Pool (GB)

( * ) Notice: Subject to any disclaimer, the term of this patent is extended or adjusted under 35 U.S.C. 154(b) by 583 days.

(21) Appl. No.: 12/657,740

(22) Filed: Jan. 27, 2010

(65) Prior Publication Data

US 2011/0154619 A1 Jun. 30, 2011

(30) Foreign Application Priority Data

Dec. 30, 2009 (GB) .................................. 0922682.0

(51) Int. Cl.
*H02G 15/02* (2006.01)
*H02G 15/08* (2006.01)
*H02G 15/14* (2006.01)

(52) U.S. Cl.
USPC ........... 24/122.6; 24/122.3; 174/70 S; 174/89

(58) Field of Classification Search
USPC ................. 24/112, 115 R, 122.3, 122.6, 909, 24/265 EE; 174/70 S, 73.1, 89; 403/267, 403/268, 275
See application file for complete search history.

(56) References Cited

U.S. PATENT DOCUMENTS

| | | | | | |
|---|---|---|---|---|---|
| 2,661,389 | A | * | 12/1953 | Presswell | 174/50 |
| 2,697,739 | A | * | 12/1954 | Presswell | 174/70 S |
| 2,877,031 | A | * | 3/1959 | Lee | 403/291 |
| 3,054,848 | A | * | 9/1962 | Reesby et al. | 174/89 |
| 3,672,712 | A | * | 6/1972 | Davis | 403/268 |
| 3,855,414 | A | * | 12/1974 | Alleva et al. | 174/89 |
| 3,903,588 | A | * | 9/1975 | Alleva et al. | 29/461 |
| 4,180,103 | A | * | 12/1979 | Mollere | 138/109 |
| 4,259,543 | A | * | 3/1981 | Oldham | 174/70 S |
| 4,507,008 | A | * | 3/1985 | Adl et al. | 403/275 |
| 4,744,065 | A | * | 5/1988 | Higraff et al. | 367/191 |
| 5,022,780 | A | * | 6/1991 | Shaw | 403/275 |
| 6,061,879 | A | * | 5/2000 | Ericson et al. | 24/304 |
| 6,854,164 | B2 | * | 2/2005 | Bass et al. | 24/136 R |
| 7,469,774 | B2 | * | 12/2008 | Ach | 187/411 |
| 2011/0154619 | A1 | * | 6/2011 | Ward et al. | 24/115 R |

* cited by examiner

*Primary Examiner* — Robert J Sandy
*Assistant Examiner* — Tyler Johnson
(74) *Attorney, Agent, or Firm* — John H. Lynn; Lynn & Lynn

(57) ABSTRACT

A cable termination system and method of assembly is provided that clamps strength members of the cable after they have been wrapped around a winding member. The clamping force required is therefore reduced by the capstan effect of the winding member. The winding member is preferably a torus that encircles the cable, and the system may comprise a number of progressively larger tori arranged in sequence along the cable to provide sufficient room for wrapping all of the strength members around them.

19 Claims, 5 Drawing Sheets

CABLE TERMINATION SYSTEM

CROSS REFERENCE TO RELATED APPLICATION

Priority for this application is claimed based on British application GB 0922682.0, filed 30 Dec. 2009.

BACKGROUND OF INVENTION

This invention relates to cable termination systems, more particularly to undersea cable (or umbilical) termination systems.

Modern sub-sea cables are often laid in hazardous environments, and can be subject to high force loadings. In order to ruggedize the cables so that they are capable of withstanding these forces, they usually comprise a woven outer armour layer. For heavyweight cables, this armour layer may be thick steel cables, wires or similar. This sturdy armoured layer preferably takes the strain when the cable is stretched or bent, protecting the inner components of the cable. However, the cables are consequently large and heavy, and are not very flexible which can make working with them difficult.

In the art, the term cable typically refers to structures having cores and fibre optics. An umbilical generally refers to a structure that may include cables as well as hoses, fibre optics etc. In this document, references to cables refer to any kind of cable structures including umbilical systems.

In some applications, it is desirable to use a lighter cable, and one that is less resistant to bending. Such lightweight cables may have a lightweight armour layer comprising synthetic fibres. Such an armour layer is capable of withstanding tension without impairing the flexibility of the cable. Another term used in the art for the individual strands or bundles thereof in such an armour layer is "strength member". This is because the main function served by the synthetic fibres is adding tensile strength and resilience to the cable, rather than armouring it against external influences.

The part of a cable close to its termination, for example, at the cable's final destination, is often subject to a particularly high strain as the flexible, moveable cable is connected to a stationary, rigid object. As such, it is preferable that the cable is securely coupled to the structure the cable is connected to, otherwise the termination forms a natural weak point in the cable system. This is carried out through a cable termination structure, which is mounted on the cable and coupled to the structure. Cable termination structures are generally securely coupled to the armour layer or strength members of a cable for transferring forces to them, leaving the inner components of the cable to pass through or around them.

An example of a cable termination structure is illustrated in FIG. 1. The key component of this structure is the spike, 100, which is in the form of a hollow cone. The hollow in the centre of the spike allows the central components 104 of the cable through, and the strength members 103 pass around the outside of the spike and are held in place after passing around the wide end 101 of the spike. Such a termination structure will normally be encased in resin in order to hold the armour layer in place.

One of the problems with this cable termination structure is that the strength members are laid unevenly along the spike. Those at the tip 102 of the spike are closer and tighter packed than those at end 101 of the spike. This results in un-even contact pressure over the whole surface of the spike, which is undesirable. A further problem with this termination structure is that the tip of the spike 102 should have a small radius of curvature, in order to protect the strength members as they exit the cable and run over the spike. Truncating the spike tip does not alleviate the situation, and further induces higher side load stresses in the strength members when the cable is subjected to a torque.

A further problem with this cable termination structure emerges at high loads. Those strength members at the tip 102 of the spike, due to their being tightly packed, may actually crush and sever each other, where they press on each other. This is obviously undesirable as transient loads are capable of destroying the integrity of the termination. Furthermore, over time the resins used to retain the strength members at the tip 102 of the spike can migrate to the wide end 101 of the spike, where the high tensions can break down the resin. This produces sharp crystal particles that can sever the strength members in this critical load-bearing zone.

BRIEF SUMMARY OF THE INVENTION

Therefore according to the present invention there is a provided a cable termination assembly for terminating a cable having an inner component and a plurality of strength members arranged around the inner component, the termination assembly comprising: a winding member for wrapping one or more strength members around; and clamping means for securing the strength members relative to the winding member.

This arrangement helps the strength members to bear any tensile load in the cable more evenly and without crushing each other, which can help to improve the reliability and strength of the terminations. Wrapping the strength members around the winding members uses the surface friction (the capstan effect) to transfer the tensile load in the strength members to the winding member thereby helping to reduce the securing force needing to be applied to the strength members by the clamping means.

Preferably the clamping means secures the strength members by clamping the ends of the strength members that have been wrapped around the winding member. The strength members come from the cable and are wrapped around the winding member and then the free ends are clamped to bear the tensile load on the strength members.

The winding member preferably forms a ring having a central channel through which the inner components of the cable may pass. This provides a structure around the inner components which can pass out of the end of the termination structure unhindered.

The cable termination assembly may also include a termination body coupled to the winding member with the clamping means comprising a clamp for securing the strength members against the termination body. In this way, the termination body and clamping means can engage each other with the strength members in-between. The termination body is coupled to the winding member so that they are relatively restrained such that the tension in the strength members is maintained. By forming the termination body annularly around the cable, with a similar annular clamping structure, an effective clap can be formed with the strength members running from the winding member to the clamp without crossing each other.

Preferably, the termination body includes a channel through which the cable may pass. This allows the inner components to pass out of the cable and through the termination body and the winding member without bending.

Whilst the invention may include a single winding member, it may also be used with two or more winding members. The strength members may then be distributed between the first and second winding members and any other winding members. This helps to distribute the strength members more evenly so that there is even less possibility of them being overcrowded and thereby overlapping or engaging each other in use.

The winding members may have any suitable structure to carry the strength members but they preferably have a toroidal shape. This helps to ensure that the strength members engage the surface of the winding members along a tangent, to minimise and bending strain. Having a circular or elliptical toroid also helps to avoid bending strain concentration as the strength members pass around the winding member.

However, the winding member may have other shapes and may include cross-sections with non-circular shapes, such as polygons. Whilst this may increase local bending stress, it can help to improve friction around the winding member. Any non-circularity may be confined to part of the surface such as after half a turn such that the most heavily stressed parts of the strength members initially run around a circular part of the winding member and then around the remainder of the winding member which includes polygonal shapes to improve friction.

Whilst the winding members may have a toroidal shape, they may not form a complete ring and may be formed of a number of sections of a ring.

The present invention also provides a terminated cable comprising a cable having an inner component with a plurality of strength members arranged around the inner component and a termination assembly, the termination assembly comprising a winding member around which one or more of the strength members are wrapped and clamping means securing the strength members relative to the winding member.

Advantageously, the clamping means clamps the ends of the strength members that have been wrapped around the winding member, as suggested above.

The winding member may form a ring having a central channel through which inner component of the cable passes.

The terminated cable may further comprise a termination body coupled to the winding member with the clamping means comprising a clamp, which secures the strength members against the termination body.

Preferably, the termination body includes a channel through which the cable passes, the winding member being closer to the end of the terminated cable than the termination body.

Similarly to the cable termination assembly above, the terminated cable may further comprise a one or more further winding members coupled to the first winding member.

The winding members of the terminated cable preferably have a toroidal shape or be formed of a number of (not necessarily contiguous) sections, together having a toroidal shape. These preferably have circular or elliptical cross-sections but may have other sections, such as polygonal sections.

The present invention further provides a method of terminating a cable comprising an inner component and a plurality of strength members, the method comprising winding one or more of said strength members around a winding member and clamping the loose end of said one or more strength members relative to the winding member.

Preferably, the winding member is coupled to a termination body and the clamping step involves clamping the loose end of said one or more strength members against a surface of the termination body.

Preferably, the termination body defines a channel for fitting over and around the cable and the winding member is a ring for fitting around the inner component of the cable. In this case, the method can comprise an initial step of placing the termination body and winding member around the cable or at least the inner components of the cable.

The placing step is preferably performed so that the winding member is closer to the end of the cable to be terminated than the termination body.

Where the termination body and winding member are coupled to a second of further winding member, the winding step can comprise winding some of the strength members around the first winding member and winding other strength members around the second and other winding members.

The clamping means of the terminated cable may comprise a resin bonding member for securing the strength members against the termination body.

A layer of elastomer may be provided between the clamp and strength members of the terminated cable. The termination assembly mentioned above may also be encased in a resin.

In the invention, the surface of the winding member may be rough for resisting movement of the strength members. As the load bearing effect and transfer of load to the winding member relies on friction between the strength members and the surface of the winding member, roughening of the surface helps to maximise the capstan effect.

BRIEF DESCRIPTION OF THE DRAWINGS

A specific embodiment of the present invention will now be described, by way of example, with reference to the drawings in which.

DETAILED DESCRIPTION OF THE INVENTION

The embodiment described below relates to an undersea cable termination system and associated tools and methods. However, the principles described may be adapted for use in other cable termination systems.

Figure 2:
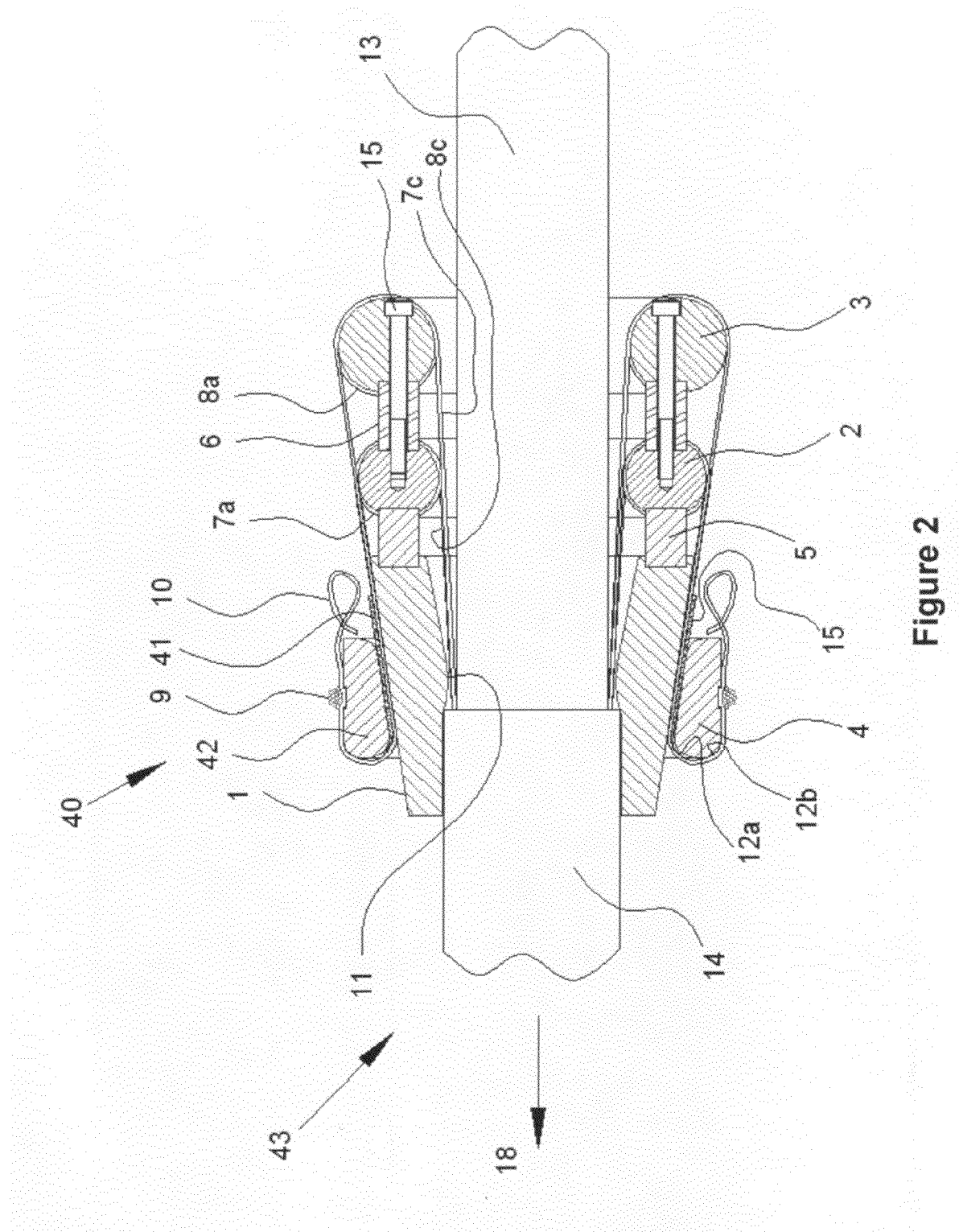
FIG. 2 is a schematic cross section of a cable termination structure in accordance with the invention.
Figure 3:
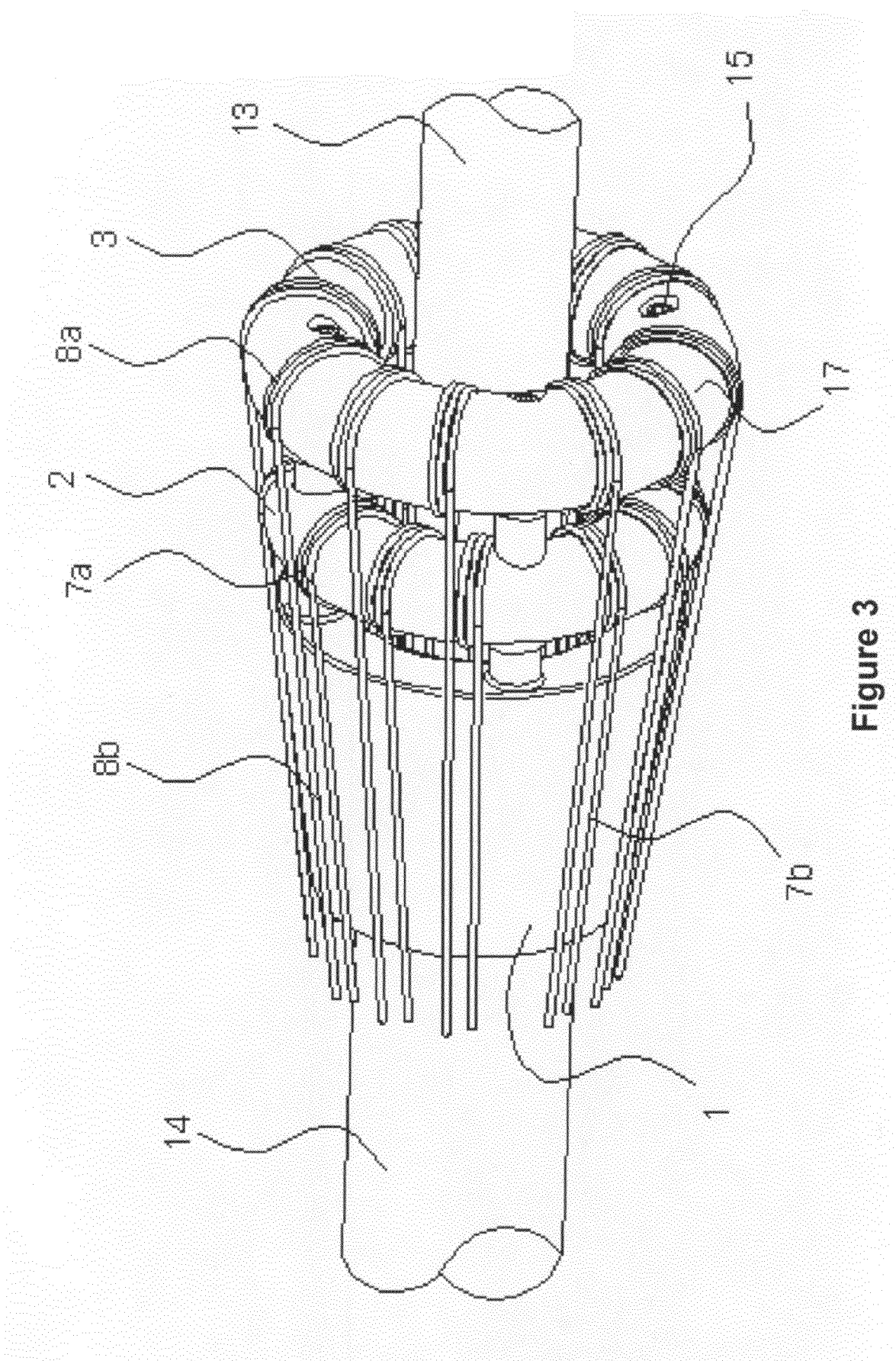
FIG. 3 is a perspective view of a cable termination structure in accordance with the invention.

Referring to FIGS. 2 and 3, cable 43 is shown with cable termination structure 40 mounted on it. The outer layer 14 of the cable has been stripped away to reveal the strength members 7, 8 and the inner components 13 of the cable. The termination structure comprises a termination body 1 with a first torus 2 and a second torus 3 mounted upon it by first and second spacing members 5 and 6. As shown in FIG. 2, the first torus 2 and first spacing member 5 form a unitary body with the termination body 1, whilst the second torus 3 and spacing member 6 are a separate component that has been mounted to the first torus with bolts 15.

Figure 1:
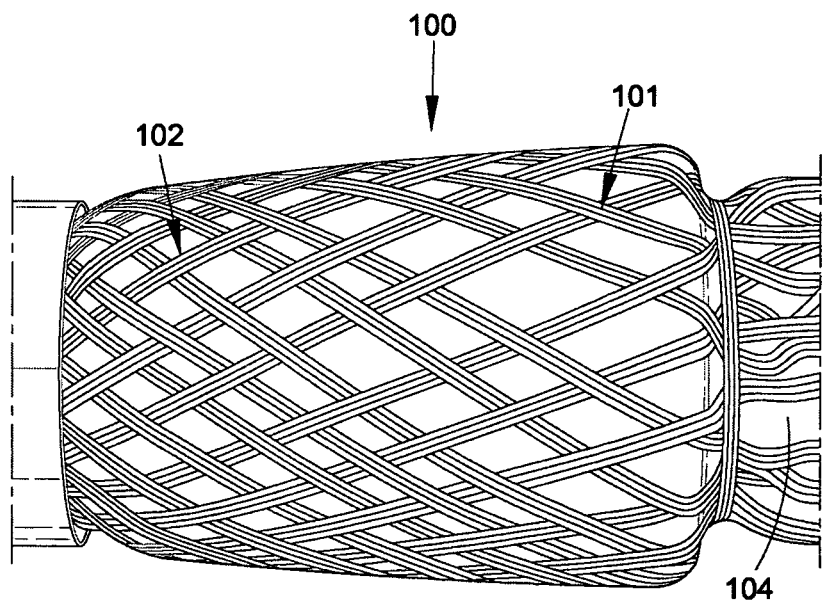
FIG. 1 is an external view of a cable termination structure.

The termination body 1 forms a hollow cone, similar to the spike 2 of FIG. 1. However, in this termination structure, the strength members pass through the central hollow of the termination body 1. The strength members are then wound around either the first or second torus (2 or 3) for one-and-a-half turns, before passing back along the outside of termination body 1. They are then wrapped back around a strength member retaining ring 4, which is a solid ring that encircles the termination body.

Figure 4:
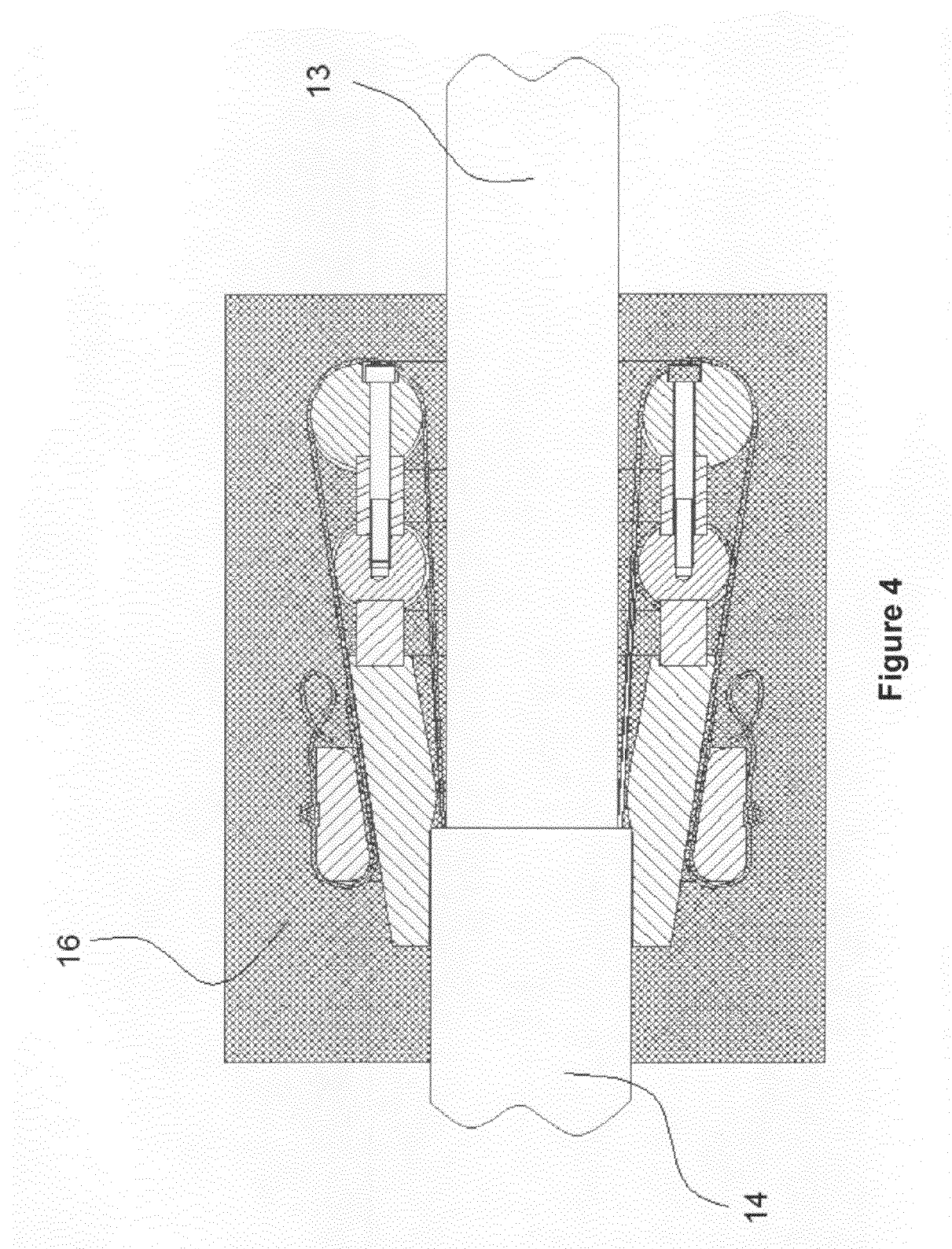
FIG. 4 is a schematic cross section of a cable termination structure embedded in a resin.

The strength member retaining ring 4 clamps the strength members against the termination body in order to prevent the strength members slipping. The strength members are further secured on top of the strength member retaining ring by securing band 9. The loose ends 10 of the strength members are then tied into knots in small groups. Finally, the entire assembly is enclosed in a block of elastomeric resin 16 as shown in FIG. 4. This provides friction to the strength members and prevents them from slackening in the absence of tension on the termination assembly.

Strength member retaining ring 4 has an internal surface that is complementary to the outer surface of termination body 1, matching its angle to ensure good clamping of the strength members 7, 8. In order to prevent crushing of the strength members, an elastomeric tape 41 is positioned between retaining ring 4 and the strength members 7, 8. Furthermore, retaining ring 4 has a curved end 42 on the inner 12a and outer radius 12b in order to prevent local strength member bending stress or abrasion.

Termination body 1 has an internal radially inwardly projecting protrusion 11 that supports the strength members 7, 8, and around which they bend slightly in order to angle away from the axis of the cable 43 and towards the tori 2 and 3. This protrusion is smoothly curved in order to prevent local strength member bending stress or abrasion. The radius of the curve will normally be greater than the radii of the tori. This protrusion helps to prevent a stress zone in the strength members between where they exit the cable from under the outer layer and the torus.

The surface of the first and second tori (2 and 3) is slightly rough, in order to provide friction between the strength members 7, 8 and the surface and to prevent abrading of the strength member which would occur if it slid over the surface under tension. This roughness is typically providing by standard grit blasting of the surface.

Figure 5:
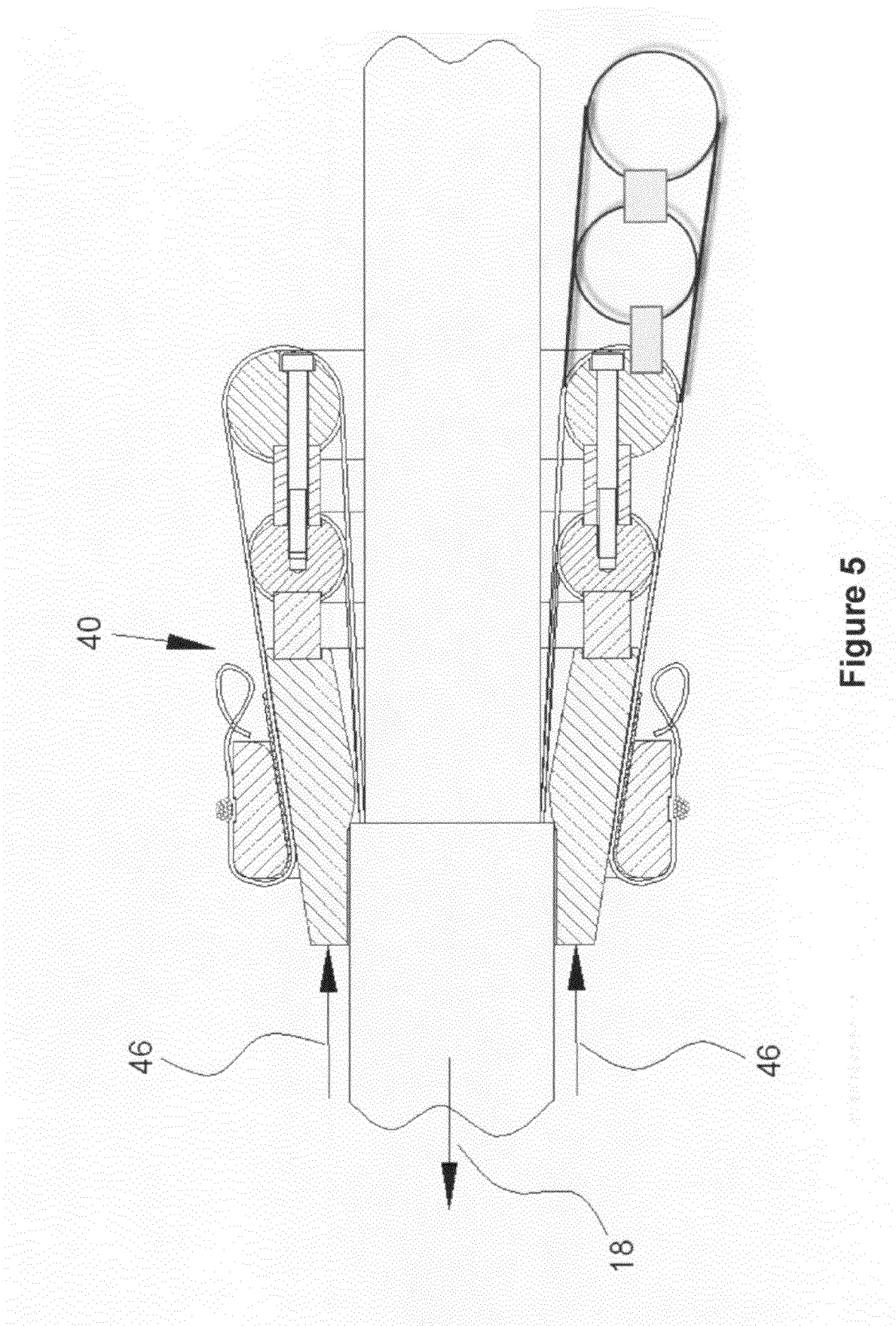
FIG. 5 is a schematic cross section of a cable termination structure showing the addition of additional winding members.

Arrow 18 shows the normal direction of the loading force on the cable, which is away from the termination structure 40 and hence represents a pull on the cable away from whichever structure it is mounted to. This load will be counteracted by a reaction from the structure, acting through the termination structure 40 as shown in FIG. 5 by the arrows 46.

The section 7c, 8c of the strength members before they are wrapped around the tori bear most of the load 18 that is being applied to the cable. This means that the sections 7a and 8a of the strength members wrapped around the tori are pulled tight around the torus. According to the capstan equation, the sections 7b and 8b of the strength members can be held against the load 18 by a significantly smaller force, as the tension in the strength members 7c, 8c is largely counteracted by friction between the strength members and the tori. This holding force is provided by the retaining ring 4 and securing band 9. As such, the section 7b, 8b of the strength members are under significantly less tension than the sections 7c, 8c. Typically, the tension in sections 7b, 8b is approximately 25% of that in section 7c, 8c. Accordingly, the tension in the strength members where the clamping occurs (at retaining ring 4) is advantageously reduced.

In summary, the strength members are actually clamped by the retaining ring 4 against the termination body 1. The clamping pressure necessary is reduced by the use of the tori, which according to the capstan equation reduce the tension that must be held in the sections 7b, 8b of the cables when compared to the overall tension that is resisted by the termination assembly. Reducing the clamping pressure advantageously reduces the risk of crushing or otherwise severing the strength members.

Such a termination structure 40 has a number of advantages over the termination structure shown in FIG. 1. In particular, the tori 2 and 3 have a large radius, which means that the bending strain in the strength members is reduced. Furthermore, there is no crushing force applied to the strength members on the torus, mitigating the risk of severance or damage to the strength members. When compared to the termination structure of FIG. 1, retaining ring 4 applies significantly less surface pressure to the strength members than the spike, further reducing the risk of crushing them.

The provision of the tori 2 and 3, and the way that the strength members are wrapped around them, means that the strength members are all laid in a straight formation within the termination structure 40 and are not crossed over each other. Accordingly, they are subjected to equal surface pressure without any particular crushing or pinch points as are present in the spike. Furthermore, the provision of two tori means that the strength members can be spaced out to avoid over crowding. Termination structure 40 also allows the initial tension in each strength member to be controlled during the assembly of the structure. As a result, the load share between the strength members can be equalised.

The strength members contact the tori 2 and 3 at a tangent. Here, the strength members are straight and thus advantageously are not subjected to any side forces. As the tension in the strength members reduces as they circle the tori in accordance with the capstan equation, the contact pressure between the strength member and the torus correspondingly reduces. The use of a soft elastomeric resin to encase the termination structure means that the hard resins used in the spike structure of FIG. 1 are not present in the critical load area, preventing the risk of hard resin fragments severing the strength members. This also controls any torque that may be imparted to the termination assembly from the rest of the cable 43. Any torque imparted into the strength members is equally distributed among them due to the members running straight. In previous designs, typically only half the members would bear the load as the other half would effectively be in compression. The soft elastomeric resin also allows the members to flex sideways whilst being retained in order. Furthermore, the elastomeric resin will deform into a gentle curve to provide protection against bending.

As described above, this termination structure 40 is particularly suitable for use with cables having a lightweight armour layer comprising bundles, ropes or braids of synthetic fibres. These individual strength members may be braided around the cable 43, or helically wound around it. Alternative strength members may be made from a composite or be metallic, and take the form of wires, braids, strands or the like. Furthermore, the armour layer may comprise a combination of the above strength members. Although the strength member ends 10 are tied in knots in small groups, it is possible that they may be tied in groups of any number or individually.

The termination structure described above has two tori, the second torus 3 and associated support member 6 are mounted to the structure with bolts 15. However, in applications where there are few or narrow strength members, the extra space for wrapping them provided by the second torus may not be necessary and the second torus may therefore be omitted. Alternatively, in the opposite case more tori may be used and these may be further mounted onto of the second torus 3, in a similar manner to the way that the second torus 3 is mounted on the first torus 2. Such an embodiment is illustrated in the lower half of FIG. 5 with two additional tori added.

The skilled man will realise that the various components of the termination assembly 40, such as the tori and supporting members, may be separate parts that are attached as appropriate, or alternatively a unitary body. The second torus may be connected to the first torus through any appropriate securing means, including glue and screws, and may be permanently mounted to the assembly where its removal is not required.

The termination assembly 40 described above uses the capstan effect of wrapping the strength members around the tori in order to reduce the required clamping force. The skilled man will realise that other shapes of winding members could be used in the place of the tori. For example, the termination assembly may be provided with one or more straight bars around which the strength members can be wound. The winding member or members may be joined together into a ring-like structure, or alternatively have gaps between them.

The winding members are preferably in a plane perpendicular to the axis of the cable 43. This reduces the side strain on the strength members wrapped around them. Furthermore, the winding members are preferably curved around the cable rather than straight, to prevent the strength members from bunching up in the centre of the winding members.

The cross section of each winding member is preferably circular for reducing any local strain on the strength members. Alternatively, the cross section may be elliptical or polygonal, for example square. In the case that the cross section is polygonal, it is preferable that the corners are rounded to avoid applying undue strain to the strength members.

As described above, the winding members preferably make up a ring around the cable. This ring may have breaks in it, or alternatively be a continuous solid body around the cable. The overall shape of the ring may be circular, elliptical, polygonal or any other appropriate shape. In any case, as described above, the winding members preferably have a rough surface. The rough surface of the winding members may be achieved by blasting them, for example with sand, or alternatively by a chemical erosion process. In some embodiments the rough surface may be omitted completely where the additional friction is not required.

The diameter of the cross section through the ring of the first torus 2 is preferably equal to one or more times the diameter of the strength members. The second torus 3 is illustrated in the Figures as being larger in both radius of the cross section and overall diameter when compared with first torus 2. Preferably, any additional tori added to the termination structure progressively increase in size accordingly. This means that the strength members run along a tangent to the tori and termination body 1. Additional layers of strength members may run along the top of other strength members when they do not all fit side-by-side around termination body 1. Overall, the termination structure (excluding retaining ring 4 and associated securing band 9) has the form of a truncated hollow cone. The outer angle of this cone to the axis of cable 43 is preferably between 0.5 and 60 degrees, more preferably between 5 and 30 degrees and most preferably in the region of 10 degrees. The inner angle of this cone is arranged so that after the strength members come away from the protrusion 11, the strength members do not contact the termination body. In other words, the angle is greater than the angle formed between the point where the strength members leave the cable and make contact with a torus.

The strength members are shown as wrapping around the tori one-and-a-half-times. The skilled man will realise that this number may vary such as is necessary according to the geometry of the termination body 1. Furthermore, the number of wraps may be varied as necessary, between one half a turn (simply wrapped over the end) and multiple turns of the torus. Preferably, the strength members wrap one and a half or two and a half times around the tori. The strength members may be divided between the tori, with some members being wrapped around the first torus and others the second torus. Alternatively, some or all strength members may be wrapped around both tori, with, for example, a whole number of turns around the first torus and a multiple-and-a-half number of turns around the second torus. Furthermore, different strength members may be wrapped a different number of times around the torus.

Strength member retaining ring 4 may comprise a solid ring as described above, in which case it is preferably mounted on the cable 43 before the cable is terminated to avoid having to thread it along the cable from the other end. Alternatively, retaining ring 4 may comprise several segments, which act together as a clamp. As a further alternative, the retaining ring 4 may be replaced with a suitable resin bond to the ends 10 of the strength members to form an anchor. In the case that the retaining ring 4 is present, securing band 9 may comprise a synthetic fibre braid, or any other appropriate clamp, resin or clip for holding the loose ends of the strength members in place. The elastomeric tape 41 may be replaced with a section of elastomeric tube or the like. The elastomeric resin in which the termination assembly 40 is encased may, in some implementations, be replaced with a resin potting compound.

In an alternative implementation, the termination body and tori may be mounted "backwards" on the cable. In such an implementation, the strength members may wrap around the tori and would not enter the termination body, rather being secured against the outside. Accordingly, the strength members would be wrapped around the tori for a whole number of turns, rather than n+one half turns.

The invention claimed is:

1. A cable termination assembly for terminating a cable having an inner component and a plurality of strength members arranged around the inner component, the termination assembly comprising:
   a first winding member which forms a ring having a central channel through which the inner component of the cable may pass and arranged such that one or more of said strength members is freely wrapped at least once around said first winding member;
   a termination body coupled to the first winding member; and
   a clamp adapted to clamp the ends of the strength members that have been wrapped around the first winding member against said termination body, to secure the strength members relative to the winding member.

2. A cable termination assembly according to claim 1, wherein the termination body includes a channel through which the cable may pass.

3. A cable termination assembly according to claim 1, further comprising a second winding member.

4. A cable termination assembly according to claim 2, further comprising a second winding member.

5. A cable termination assembly according to claim 1, wherein the first winding member is toroidal.

6. A cable termination assembly according to claim 2, wherein the first winding member is toroidal.

7. A cable termination assembly according to claim 3, wherein at least one of the first winding member and the second winding member is toroidal.

8. A terminated cable comprising:
   a cable having an inner component and a plurality of strength members arranged around the inner component; and a termination assembly, the termination assembly comprising:
- a first winding member which forms a ring having a central channel through which the inner component of the cable passes, wherein one or more of said strength members is freely wrapped at least once around said first winding member;
- a termination body coupled to the first winding member; and
- a clamp wherein the ends of the strength members that have been wrapped around the first winding member are clamped against said termination body, to secure the strength members relative to the first winding member.

9. A terminated cable according to claim 8, wherein the clamp comprises a resin bonding member for securing the strength members against the termination body.

10. A terminated cable according to claim 8, further comprising:
- a layer of elastomer between the clamp and strength members.

11. A terminated cable according to claim 8, wherein the termination body includes a channel through which the cable passes, the first winding member being closer to the end of the terminated cable than the termination body.

12. A terminated cable according to claim 8, further comprising a second winding member coupled to the first winding member.

13. A terminated cable according to claim 8, wherein the first winding member is toroidal.

14. A terminated cable according to claim 12, wherein at least one of the first winding member and the second winding member is toroidal.

15. A terminated cable according to claim 8, wherein the first winding member has an elliptical cross section.

16. A terminated cable according to claim 8, wherein the first winding member has a substantially polygonal cross section.

17. A terminated cable according to claim 8, wherein the termination assembly is encased in a resin.

18. A terminated cable according to claim 8, wherein the surface of the first winding member is rough for resisting movement of the strength members.

19. A terminated cable comprising:
- a cable having an inner component and a plurality of strength members arranged around the inner component; and
- a termination assembly, the termination assembly comprising:
  - a first winding member around which one or more of the strength members are wrapped; and
  - a clamp arranged to secure the strength members relative to the first winding member, wherein the termination assembly is encased in a resin.

\* \* \* \* \*